B. Mallory.

Reversible Latch.

No. 3,862. Reissued Mar. 1, 1870.

Witnesses,
Rufus Sanford
John E. Earle

Inventor,
Benton Mallory

N. PETERS, PHOTO-LITHOGRAPHER, WASHINGTON, D. C.

United States Patent Office.

BURTON MALLORY, OF NEW HAVEN, CONNECTICUT.

*Letters Patent No.* 38,400, *dated May* 5, 1863; *reissue No.* 3,862 *dated March* 1, 1870.

IMPROVEMENT IN REVERSIBLE LATCHES.

The Schedule referred to in these Letters Patent and making part of the same.

*To all whom it may concern:*

Be it known that I, BURTON MALLORY, of New Haven, in the county of New Haven, and State of Connecticut, have invented a new Improvement in Locks and Latches; and I do hereby declare the following, when taken in connection with the accompanying drawings and the letters of reference marked thereon, to be a full, clear, and exact description of the same, and which said drawings constitute a part of this specification, and represent in—

Figure 1:
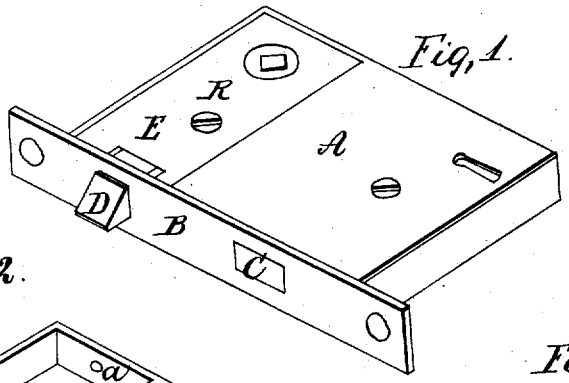
Figure 2:
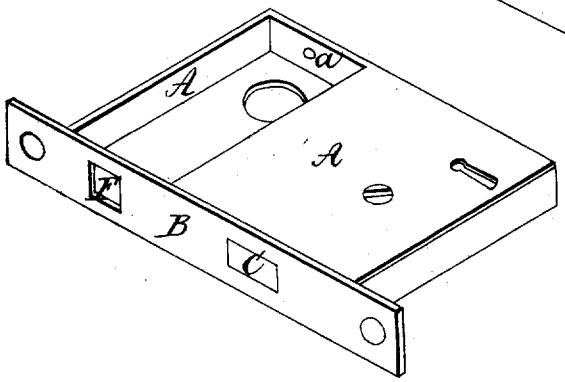
Figure 3:
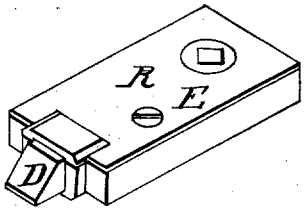
Figure 4:
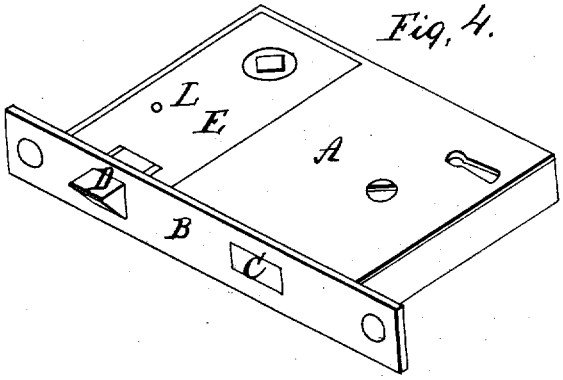

Figure 1, a perspective view of a lock and latch, with my improvement as fitted for a right-hand door;

Figure 2, a perspective view of the same, with my improvement removed;

Figure 3, a perspective view of the latch-bolt case, my improvement removed from the main case; and in Figure 4, a perspective view of a lock and latch, with my improvement reversed from fig. 1 for a left-hand door.

Mortise locks and latches are distinguished by the title of right and left, according to the swinging of the door to which they are applied.

A very great difficulty exists in the sale of such locks and latches, from the fact that what is properly called a right-hand door is often by the inexperienced termed a left-hand door, or *vice versa*, or another difficulty arises when perchance a purchaser orders a quantity of locks and latches without naming either right or left. After stating these two difficulties it will require no further argument to show what confusion and trouble must necessarily arise not only to the dealers but to the consumers.

There have been various devices to overcome these troubles, but without accomplishing the desired end, rather making it confusion worse confounded, from the fact that in all it has been required to open the case of the latch and change some part of the mechanism, which, unless in the hands of an expert, adds to the difficulty, by so far disarranging the parts as to render the lock and latch useless.

The existence of these difficulties, and the consequent demands for a simple arrangement, which in the hands of an inexperienced person could be readily changed from right to left, or *vice versa*, without possible danger of injury to any of its parts, have suggested the improvement herein described.

My invention consists in the arrangement of the latch-bolt and its operative mechanism in a case or frame independent of the main case, and inclosed in the main case, so that the latch-bolt may be reversed without disconnection from its operative mechanism.

A is the case, inclosing in its lower part the lock-bolt C.

B the face plate, and

D the latch-bolt.

The latch-bolt D is, with its operative mechanism, fitted to and placed in a case, E, independent of the other part of the case, and shown in fig. 3. I form a recess in the main case, as shown in fig. 2, into which I place the said latch-bolt case E. If desired for a right-hand door, I place the latch-bolt case in the main case with the letter R upward, which denotes that in such position, (see fig. 1,) it is for a right-hand door. If desired for a left-hand door, I reverse the said latch-bolt case, and place it in the space of the main case with the other side, marked letter L, outward, to denote that in this position (as seen in fig. 4) it is for a left-hand door.

To insert the latch-bolt case into the space in the main case, place the bolt in the opening F in the face plate, press the bolt into its case, and the case will readily slip into the space prepared for it. When in its proper position, as denoted in figs, 1 and 4, I confine the case there by means of a screw inserted through the hole *a*. Other means of holding the case in place may be used, but I prefer this from its simplicity.

To remove the latch-bolt case from the main case, to reverse or for other objects, take out the said screw, press in the latch bolt, and the case may be easily removed.

While the construction above described is a thoroughly practical one, other devices for securing the latch case may be employed, so as to embody the whole gist of this invention; that is to say, the arrangement of the latch-bolt in an independent case, forming a part of the perfect whole lock and latch, so that the latch-bolt may be reversed without disconnection from or change of its operative mechanism.

I claim as my invention—

The arrangement of the latch-bolt and its operative mechanism, in a case or frame independent of the main case, and inclosed in the main case, so that the latch-bolt may be reversed without disconnection from its operative mechanism.

BURTON MALLORY.

Witnesses:

A. J. TIBBITS,

J. H. SHUMWAY.